Patented July 3, 1934

1,965,100

UNITED STATES PATENT OFFICE 1,965,100

REMOVAL OF ACETYLENE FROM GASES

Herbert Peter Augustus Groll, Berkeley, and James Henry Burgin, Oakland, Calif., assignors to Shell Development Company, San Francisco, Calif., a corporation of Delaware No Drawing. Application February 23, 1932, Serial No. 594,736

19 Claims. (Cl. 260—170)

This invention relates to a process for the removal of acetylene from gas mixtures containing the same by means of a solvent for acetylene.

The general practice of removing a desirable component gas from a crude gaseous mixture comprises: contacting said gaseous mixture in an efficient manner, preferably under pressure, with a liquid solvent for the gas to be removed, and recovering the dissolved gas from the resulting solution by distillation, release of pressure, or by a combination of the two methods. The efficiency of the process or the purity of the obtained product are determined by: the efficiency of the selective dissolving action of the solvent employed on the components of the gas mixture being treated, the chemical inertness of this solvent at the temperature of the process, and the vapor pressure difference of the liquid solvent and gaseous solute at the temperature of the gas recovery operation. The more closely these considerations are observed, the more efficient generally is the operation of the process; the recovered product is less contaminated, and the extent of further treatment is reduced.

The absorption of acetylene in acetone is well known; other solvents such as acetonitrile, various ketones, ethers, and esters have been proposed. Most of these solvents, however, possess the disadvantage of being comparatively volatile at the acetylene recovery temperatures, so that additional treatment of the gas and vapors evolved is necessary in order to remove the entrained vapors of the solvent.

It is an object of this invention to provide a class of excellent solvents for acetylene which are chemically stable, and have extremely low vapor pressures at the temperatures employed in the process, so that the absorption and recovery of the gas is efficiently accomplished and only a minimum of treatment is required to further purify the recovered product.

According to our invention, the acetylene is dissolved from a gaseous mixture in a solvent of the class of polyglycol compounds, and subsequently recovered either by heating the solution to expel the gas, or by reducing the pressure over said solution, thereby effecting the separation of the dissolved gas, or by utilizing a combination of both features.

By the term "polyglycols" is designated a class of symmetrical compounds, such as diethylene glycol, dipropylene glycol, dibutylene glycol, triethylene glycol, and the like, as well as asymmetrical compounds, as ethylene propylene glycol, ethylene butylene glycol, propylene butylene glycol, diethylene propylene glycol, diethylene butylene glycol, and the like. The polyglycols suitable for use in this invention may be either of the straight chain type as those just described, or branched-chain type such as propylene isobutylene glycol tri-isopropylene glycol, ethylene isobutylene glycol, and the like; it is to be noted that the branched-chain type compounds may be regarded as substituted straight chain compounds in which one of the hydrogen atoms in the straight carbon chain has been substituted by an alkyl group.

Besides the polyglycols, this invention comprises their derivatives as the ethers (primary, secondary or tertiary, normal or iso-), esters, (of aryl, alkyl, or aralkyl acids), and/or mixed esterethers of the polyglycols, as the solvents for acetylene. Of this group of compounds the following possess excellent properties, diethylene glycol monomethyl ether, diethylene glycol monoethyl ether, diethylene glycol monopropyl ether, diethylene glycol monobutyl ether, diethylene glycol dimethyl ether, diethylene glycol diethyl ether, diethylene glycol dipropyl ether, diethylene glycol dibutyl ether, diethylene glycol mono iso-propyl ether, diethylene glycol monotertiary butyl ether, diethylene glycol mono- or di-lactate, diethylene glycol mono- or di-benzoate, diethylene glycol mono- or di-maleate, diethylene glycol mono- or di-oxalate, diethylene glycol mono-ethyl ether formate, diethylene glycol mono-isopropyl ether benzoate, di-ethylene glycol mono-tertiary butyl ether acetate, diethylene glycol mono-phenyl ether acetate, diethylene glycol monoethyl ether acetate, diethylene glycol monoacetate, diethylene glycol diacetate, diethylene glycol monopropyl ether acetate, and diethylene glycol monobutyl ether acetate.

We have observed, that as a general rule, the absorptive power of the solvents for the acetylene gas depends on the presence of certain oxygen groups in the molecular composition of the solvent; the greater the number of these groups the more readily is acetylene dissolved by the solvent.

Of the groups thus determining the solving properties of the above enumerated compounds, the following ones have been noted: the ether group

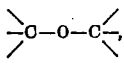

carbonyl group $=C=O$, oxo group

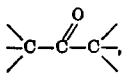

carboxyl group

and ester group

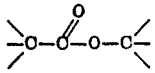

(which can be considered as a combination of the oxo and ether groups). It has been further noticed that of the solvents with the same oxygen grouping in their molecules the one having the smallest hydrocarbon radicals attached thereto possesses the greatest absorptive power towards acetylene gas, which capacity progressively diminishes as these radicals increase in molecular weight.

In carrying out our invention, gases containing acetylene are brought into contact in any desired manner, at a suitable temperature, preferably cooled, and with or without pressure, with one or more of these solvents. The acetylene is absorbed and may be recovered by heating and/or reducing the pressure on the solvent; the latter can be recirculated as in a continuous process.

Having fully described and ascertained the nature of our invention, and in what manner the same is to be performed, what we claim as new and desire to secure by the Letters Patent is as set forth in the following claims.

We claim as our invention:

1. A process of removing acetylene from a gaseous mixture by absorbing it in a solvent of the class consisting of polyglycols, their ethers, esters and mixed ester-ethers.

2. A process of removing acetylene from a gaseous mixture comprising: absorbing acetylene in a solvent of the class consisting of polyglycols, their ethers, esters and ester-ethers, and recovering it from the solvent.

3. A process of removing acetylene from a gaseous mixture, comprising: bringing said gaseous mixture in counter-current contact with a solvent of the class consisting of polyglycols, their ethers, esters and ester-ethers, thereby substantially removing acetylene from the mixture, and recovering it from the solvent.

4. A continuous process of removing acetylene from a gaseous mixture, comprising: absorbing acetylene in a solvent of the class consisting of polyglycols, their ethers, esters and ester-ethers, recovering it from the solvent, and returning the solvent, substantially free of acetylene, to the process.

5. A process of removing acetylene from a gaseous mixture by absorbing it in a solvent of the class of polyglycols.

6. A process of removing acetylene from a gaseous mixture by absorbing it in a solvent of the class of polyglycol ethers.

7. A process of removing acetylene from a gaseous mixture by absorbing it in a solvent of the class of polyglycol esters.

8. A process of removing acetylene from a gaseous mixture by absorbing it in a solvent of the class of mixed ether-ester of polyglycols.

9. A process of removing acetylene from a gaseous mixture by absorbing it in a solvent of the class consisting of dialkylene glycols, their ethers, esters and ester-ethers.

10. A process of removing acetylene from a gaseous mixture by absorbing it in a solvent of the class of dialkylene glycol ethers.

11. A process of removing acetylene from a gaseous mixture by absorbing it in a solvent of the class of dialkylene glycol esters.

12. A process of removing acetylene from a gaseous mixture by absorbing it in a solvent of the class of dialkylene glycol ether-esters.

13. A process of removing acetylene from a gaseous mixture by absorbing it in a solvent of the class consisting of diethylene glycol, its ethers, esters and mixed ester-ethers.

14. A process of removing acetylene from a gaseous mixture by absorbing it in a diethylene glycol ether.

15. A process of removing acetylene from a gaseous mixture by absorbing it in a diethylene glycol ester.

16. A process of removing acetylene from a gaseous mixture by absorbing it in a diethylene glycol ether-ester.

17. A process of removing acetylene from a gaseous mixture by absorbing it in a diethylene glycol monoethyl ether.

18. A process of removing acetylene from a gaseous mixture by absorbing it in diethylene glycol di-acetate.

19. A process of removing acetylene from a gaseous mixture by absorbing it in diethylene glycol monoethyl ether acetate.

HERBERT PETER AUGUSTUS GROLL.
JAMES HENRY BURGIN.